(12) United States Patent
Stilgenbauer et al.

(10) Patent No.: US 8,407,997 B2
(45) Date of Patent: Apr. 2, 2013

(54) MULTISTEP TURBOCHARGER ARRANGEMENT

(75) Inventors: Michael Stilgenbauer, Bolanden (DE); Gerald Schall, Bobenheim-Roxheim (DE)

(73) Assignee: BorgWarner Inc., Auburn Hills, MI (US)

( * ) Notice: Subject to any disclaimer, the term of this patent is extended or adjusted under 35 U.S.C. 154(b) by 787 days.

(21) Appl. No.: 12/519,560

(22) PCT Filed: Oct. 24, 2007

(86) PCT No.: PCT/EP2007/009233
§ 371 (c)(1),
(2), (4) Date: Jun. 17, 2009

(87) PCT Pub. No.: WO2008/083769
PCT Pub. Date: Jul. 17, 2008

(65) Prior Publication Data
US 2010/0037606 A1    Feb. 18, 2010

(30) Foreign Application Priority Data
Dec. 21, 2006 (DE) .......................... 10 2006 060 743

(51) Int. Cl.
*F02B 33/44* (2006.01)
*F02B 33/00* (2006.01)
*F02D 23/00* (2006.01)
(52) U.S. Cl. ............................. 60/612; 60/602; 123/562
(58) Field of Classification Search .................. 60/612, 60/602; 123/562
See application file for complete search history.

(56) References Cited

U.S. PATENT DOCUMENTS

| 3,233,403 | A | * | 2/1966 | MacInnes et al. | 60/600 |
| 4,211,081 | A | * | 7/1980 | Yamada | 60/602 |
| 4,304,097 | A | * | 12/1981 | Kondo et al. | 60/602 |
| 4,387,570 | A | * | 6/1983 | Iwamoto et al. | 60/600 |
| 4,466,248 | A | * | 8/1984 | Nartowski | 60/602 |
| 4,864,993 | A | * | 9/1989 | Itoh et al. | 123/383 |

(Continued)

FOREIGN PATENT DOCUMENTS

DE            10230934 A1      1/2004
DE      102008020049 A1 *   10/2009

(Continued)

OTHER PUBLICATIONS

A Machine Translation Peter Staub et al. (Pub. Number EP 1 136 676 A2), published on Sep. 26, 2001.*

(Continued)

*Primary Examiner* — Thai Ba Trieu
(74) *Attorney, Agent, or Firm* — William G. Anderson; Stephan A. Pendorf; Patent Central LLC

(57) ABSTRACT

The invention relates to a multistep turbocharger arrangement (1) for an internal combustion engine with a high-pressure step (2), with a low-pressure step (3) which can be brought into operative connection to the high-pressure step (2) over a fluid passage system (4) which can be opened and closed, and with a control unit (5) for controlling the operative connection between the high-pressure step (2) and the low-pressure step (3), wherein the control unit (5) and the fluid passage system (4) are integrated in an engine exhaust manifold (6) which is disposed between the high-pressure step (2) and the low-pressure step (3).

5 Claims, 4 Drawing Sheets

U.S. PATENT DOCUMENTS

| | | | |
|---|---|---|---|
| 5,199,261 A * | 4/1993 | Baker | 60/612 |
| 6,295,814 B1 * | 10/2001 | Schmidt et al. | 60/602 |
| 6,976,359 B2 * | 12/2005 | Hastings et al. | 60/602 |
| 8,028,525 B2 * | 10/2011 | An et al. | 60/612 |
| 2002/0078934 A1 * | 6/2002 | Hohkita et al. | 60/602 |
| 2006/0042246 A1 * | 3/2006 | Gray et al. | 60/612 |
| 2007/0169479 A1 * | 7/2007 | Nicolle et al. | 60/612 |

FOREIGN PATENT DOCUMENTS

| | | | |
|---|---|---|---|
| EP | 266256 A1 * | 5/1988 | |
| EP | 1136676 A2 | 9/2001 | |
| EP | 1219799 A2 | 7/2002 | |
| EP | 1626169 A1 | 2/2006 | |
| GB | 2043771 A * | 10/1980 | |
| GB | 2077354 A * | 12/1981 | |
| GB | 2110755 A * | 6/1983 | |
| JP | 60095134 A * | 5/1985 | |
| JP | 03026826 A * | 2/1991 | |
| WO | 2007084592 A2 | 7/2007 | |

OTHER PUBLICATIONS

A Machine Translation Spaeder Uwe et al. (Pub. Number EP 1 626 169 A1), published on Feb. 15, 2006 2001.*

* cited by examiner

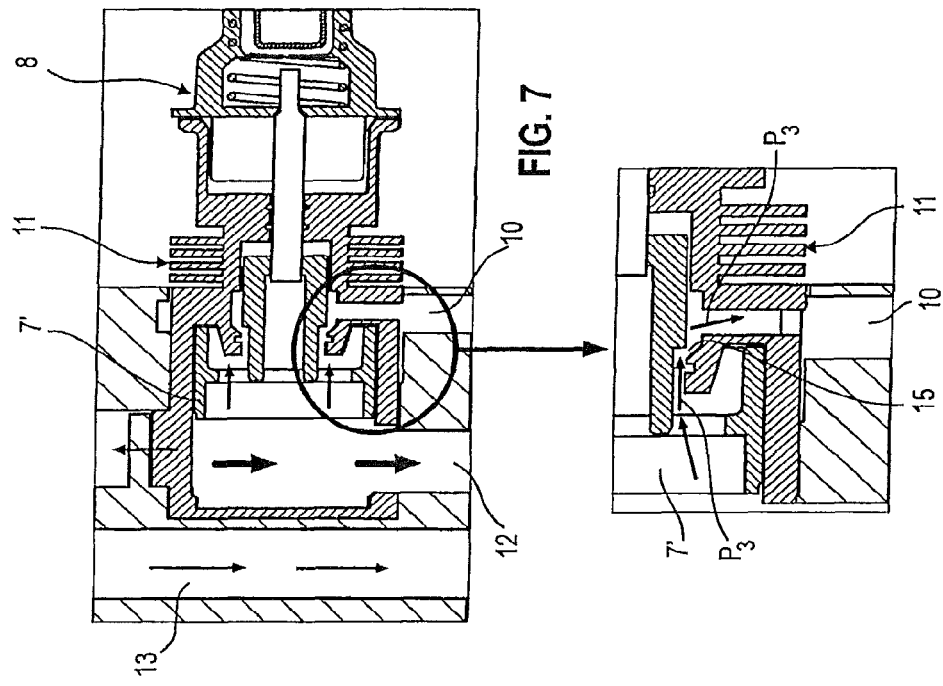
FIG. 7
FIG. 8
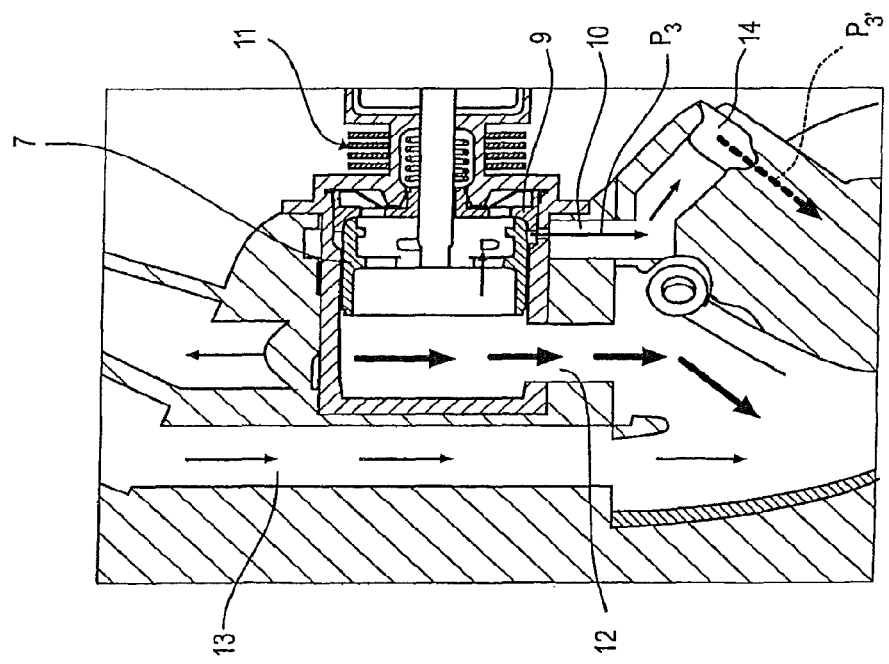
FIG. 6

MULTISTEP TURBOCHARGER ARRANGEMENT

FIELD OF THE INVENTION

The invention relates to a multi-stage turbocharger arrangement.

BACKGROUND OF THE INVENTION

Known multi-stage turbocharger arrangements have the disadvantage of a complex design, with flaps, sleeves and control capsules which are highly susceptible to wear, in particular as a result of a fragile crank drive. Furthermore, uniform and continuous cross-sectional openings, which contribute to the regulating accuracy or quality of the regulating characteristic, can only be realized to a limited extent.

SUMMARY OF THE INVENTION

It is therefore an object of the present invention to create a multi-stage turbocharger arrangement, the regulating system of which has improved regulating accuracy and a simplified and compact design.

This object is achieved by means of a multi-stage turbocharger arrangement for an internal combustion engine. The multi-stage turbocharger arrangement includes a high-pressure stage and a low-pressure stage. The low-pressure stage is operatively connected to the high-pressure stage by means of an openable and closable flow duct system. The multi-stage turbocharger arrangement includes a regulating unit for regulating the operative connection between the high-pressure stage and the low-pressure stage. The regulating unit and the flow duct system are integrated in an engine exhaust-gas manifold, which is arranged between the high-pressure stage and the low-pressure stage.

According to the invention, a simplified regulating unit for regulating the operative connection between the high-pressure turbocharger or the high-pressure stage and the low-pressure turbocharger or the low-pressure stage of the turbocharger, which regulating unit is arranged in the manifold between the high-pressure stage and the low-pressure stage and in which regulating unit are integrated all of the required flow ducts.

The subclaims relate to advantageous refinements of the invention.

BRIEF DESCRIPTION OF THE DRAWINGS

Further details, advantages and features of the present invention can be gathered from the following description of exemplary embodiments on the basis of the drawing, in which:

FIG. 6 shows an illustration corresponding to FIG. 3, of the turbocharger arrangement according to the invention in a third switching state, and FIGS. 7 and 8 show the variant according to FIG. 5 in the switching state as per FIG. 6.

DETAILED DESCRIPTION OF THE INVENTION

Figure 1:
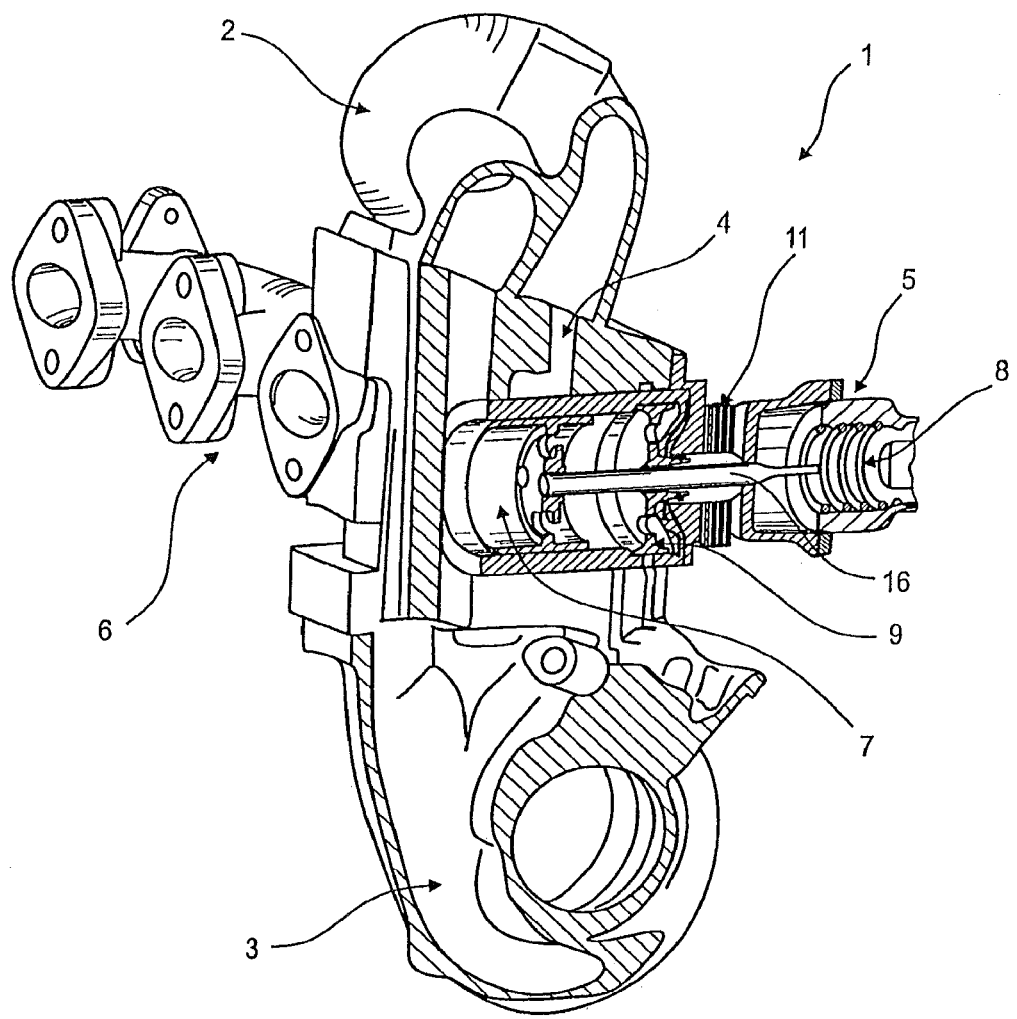
FIG. 1 shows a first embodiment of a turbocharger arrangement, which is of two-stage design in the example, according to the present invention.

FIG. 1 illustrates a multi-stage turbocharger arrangement 1, which is of two-stage design in the example, for an internal combustion engine, in particular a diesel or spark-ignition engine, wherein the engine is however not shown in FIG. 1 in order to simplify the illustration.

The turbocharger arrangement 1 has a high-pressure stage 2 and a low-pressure stage 3, which are formed in each case by a correspondingly designed turbocharger, of which in each case the turbine housing of the turbine is illustrated in the figures.

The high-pressure stage 2 and the low-pressure stage 3 can be operatively connected to one another by means of an openable and closable flow duct system 4, for which purpose a regulating unit 5 is provided.

Figure 2:
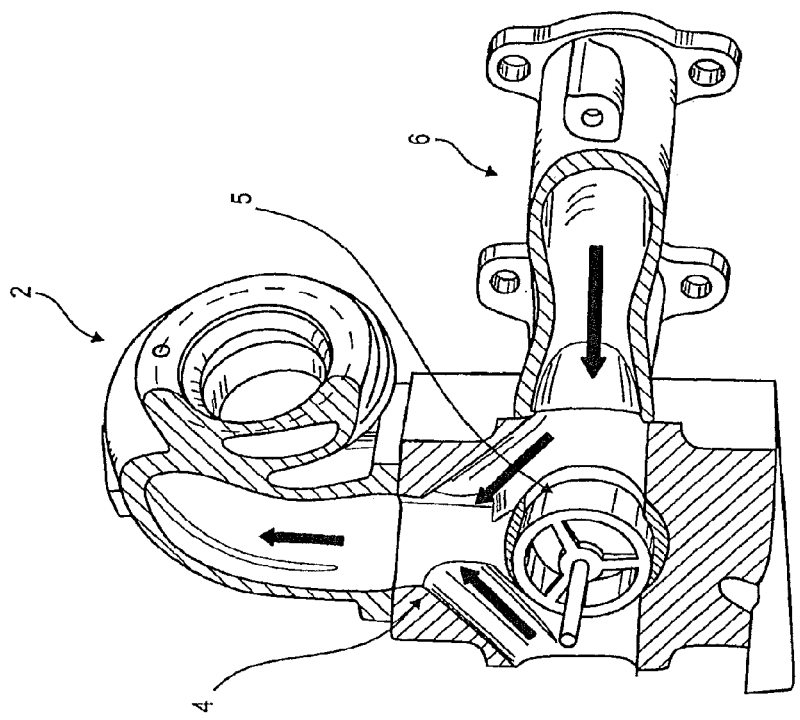
FIG. 2 shows a partially sectioned perspective partial view of the turbocharger arrangement according to FIG. 1.

As can be seen in particular from FIGS. 1 and 2, the regulating unit 5 is arranged in a manifold 6 between the high-pressure stage 2 and the low-pressure stage 3. As is evident from a comparison of all the figures, the flow duct system 4, which can be opened and closed by means of the regulating unit 5, is also integrated in the manifold 6.

In the embodiment according to FIGS. 1 to 3 and 4 to 6, the regulating unit 5 firstly has a regulating slide 7 which can be actuated by means of an actuator 8, for which purpose the regulating slide 7 can be slid by means of an actuating rod 16, which is driven by the actuator 8, along an axis which runs through the actuating rod 16.

In the abovementioned embodiment, the regulating unit 5 also has a bypass slide 9 which, in order to open and close a bypass duct 10, is arranged, like the regulating slide 7, in an axially slidable fashion in a housing 17 of the regulating unit 5. In the switching position which is illustrated by way of example in FIG. 3, the bypass slide 9 closes the bypass duct 10, with the bypass slide 9 being pre-loaded into its closed position, for example by means of a suitable spring.

Figure 3:
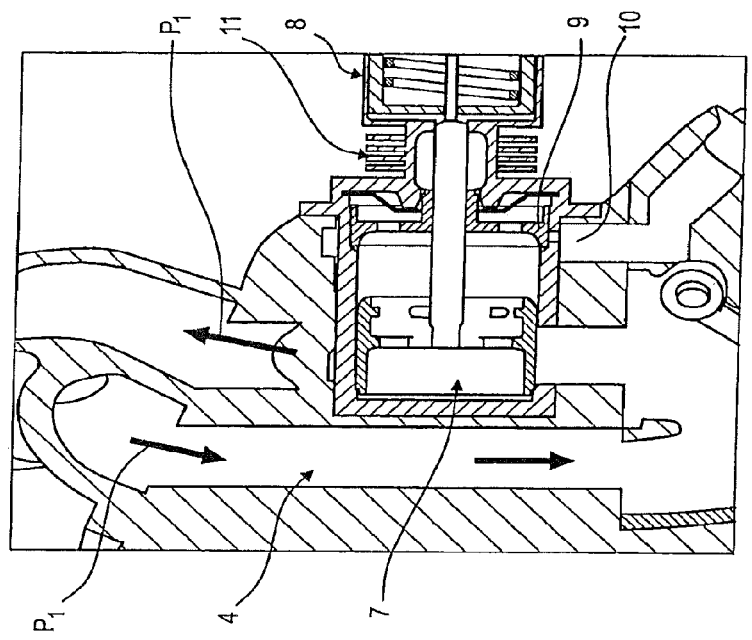
FIG. 3 shows a sectioned partial view of the turbocharger arrangement in a first switching state.

In the first switching position, which can be seen in particular from FIG. 3, the regulating slide 7 closes the direct path, which is formed by a flow duct 12 of the flow duct system 4, to the low-pressure stage 3, with the first switching position being set at low engine speeds and therefore low exhaust-gas flow rates. Therefore, in the first switching position of the regulating unit 5 as illustrated in FIG. 3, the exhaust gas expands in the high-pressure stage 2. This is indicated by the arrows $P_1$ in FIG. 3.

Figure 4:
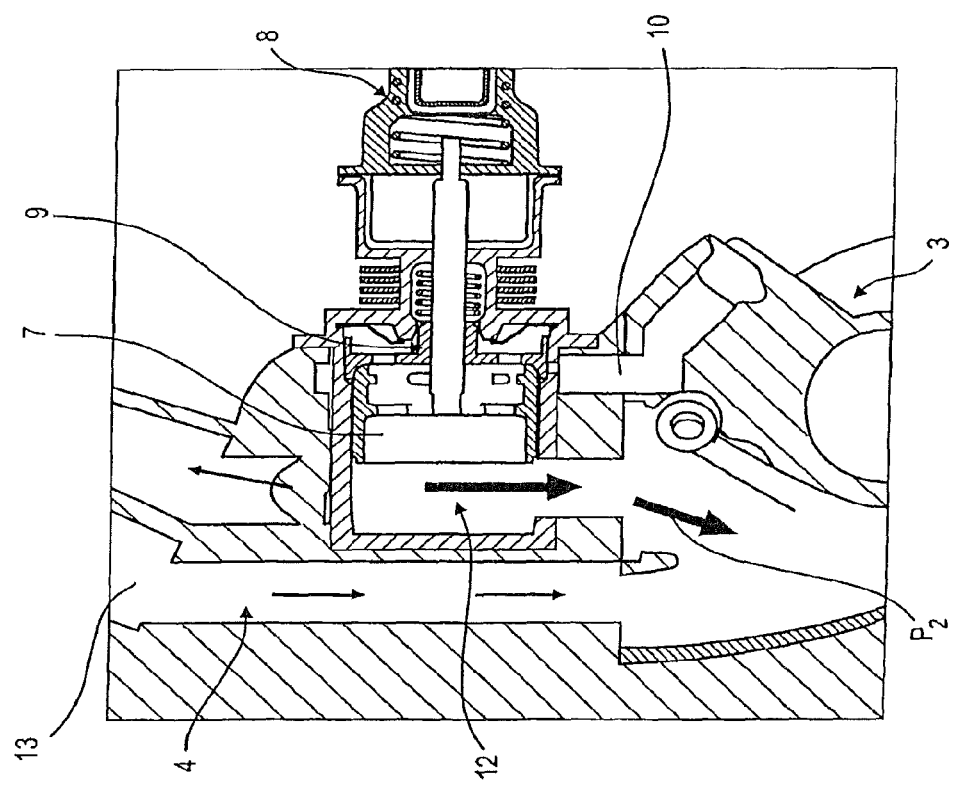
FIG. 4 shows a view, corresponding to FIG. 3, of the turbocharger arrangement in a second switching state.

In the second switching position, as illustrated in FIG. 4, the regulating slide 7 opens the flow duct 12, or manifold cross section, in a preferably stepped fashion with increasing engine speed, such that the exhaust gas is conducted directly to the low-pressure stage 3, as indicated by the arrows $P_2$ in FIG. 4.

Figure 5:
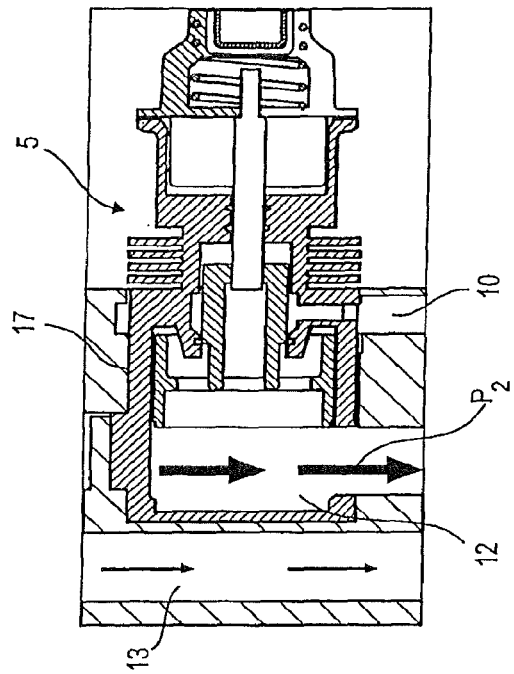
FIG. 5 shows a variant of the turbocharger arrangement in the switching state as per FIG. 4.

A corresponding switching position is illustrated in FIG. 5, which illustrates a variant of the embodiment according to FIG. 4, since no separate bypass slide is provided here. As shown by the illustrations of FIGS. 4 and 5, the bypass duct 10 is closed in each case in the second switching position.

FIG. 6 illustrates the embodiment according to FIGS. 1 to 4 in a third switching position. In the switching position, the regulating slide 7 slides the bypass slide 9 back axially, as a result of which the bypass duct 10 or the bypass duct sections of the bypass duct 10 is/are opened up. A part of the exhaust gas can thus flow past the low-pressure spiral or the low-pressure turbine housing directly to the turbine housing outlet (low-pressure stage), as indicated by the dashed arrow $P_{3'}$.

A corresponding switching position of the variant according to FIG. 5 is illustrated in FIGS. 7 and 8, for which purpose the regulating slide 7' of the variant has a connecting duct 15 which can be seen in particular from FIG. 8 and which, as in the above-described design variant, opens the bypass duct 10 such that it is possible for a part of the exhaust gas to be discharged directly to the turbine housing outlet of the low-pressure stage 3.

To complement the above written disclosure of the invention, reference is hereby explicitly made to the diagrammatic illustration of the invention in FIGS. 1 to 8.

LIST OF REFERENCE SYMBOLS

1 Turbocharger arrangement
2 High-pressure stage
3 Low-pressure stage
4 Flow duct system
5 Regulating unit
6 Manifold/exhaust manifold
7 Regulating slide
7' Regulating slide
8 Actuator
9 Bypass slide
10 Bypass
11 Cooling body
12, 13 Flow duct
14 Turbine housing section
15 Connecting duct
16 Actuating rod
17 Housing
$P_1$, $P_2$, $P_3$, Arrows

The invention claimed is:

1. A multi-stage turbocharger arrangement (1) for an internal combustion engine comprising:
a high-pressure stage (2),
a low-pressure stage (3) which is operatively connected to the high-pressure stage (2) by means of an openable and closable flow duct system (4), and
a regulating unit (5) for regulating the operative connection between the high-pressure stage (2) and the low-pressure stage (3), the regulating unit (5) including a regulating slide (7) and an actuator (8) for driving the regulating slide (7),
wherein the regulating unit (5) and the flow duct system (4) are integrated in an engine exhaust-gas manifold (6) which is arranged between the high-pressure stage (2) and the low-pressure stage (3).

2. A multi-stage turbocharger arrangement (1) for an internal combustion engine comprising:
a high-pressure stage (2);
a low-pressure stage (3) which is operatively connected to the high-pressure stage (2) by means of an openable and closable flow duct system (4); and
a regulating unit (5) for regulating the operative connection between the high-pressure stage (2) and the low-pressure stage (3), wherein the regulating unit (5) and the flow duct system (4) are integrated in an engine exhaust-gas manifold (6) which is arranged between the high-pressure stage (2) and the low-pressure stage (3), and wherein the regulating unit (5) has a bypass slide (9), by means of which a bypass (10) is opened and closed and which is pre-loaded into its bypass closed position.

3. The turbocharger arrangement as claimed in claim 2, wherein the bypass slide (9) is movable into its bypass open position.

4. The turbocharger arrangement as claimed in claim 2, wherein the bypass slide (9) is axially slidable into its bypass open position.

5. A multi-stage turbocharger arrangement (1) for an internal combustion engine comprising:
a high-pressure stage (2);
a low-pressure stage (3) which is operatively connected to the high-pressure stage (2) by means of an openable and closable flow duct system (4); and
a regulating unit (5) for regulating the operative connection between the high-pressure stage (2) and the low-pressure stage (3), wherein the regulating unit (5) and the flow duct system (4) are integrated in an engine exhaust-gas manifold (6) which is arranged between the high-pressure stage (2) and the low-pressure stage (3), and wherein the regulating unit (5) includes a regulating slide (7') having a connecting duct (15) which is flow-connected to a bypass (10) of the flow duct system (4).

* * * * *